No. 643,181.  Patented Feb. 13, 1900.
G. W. WOODWORTH.
FILTER.
(Application filed June 1, 1899.)
(No Model.)
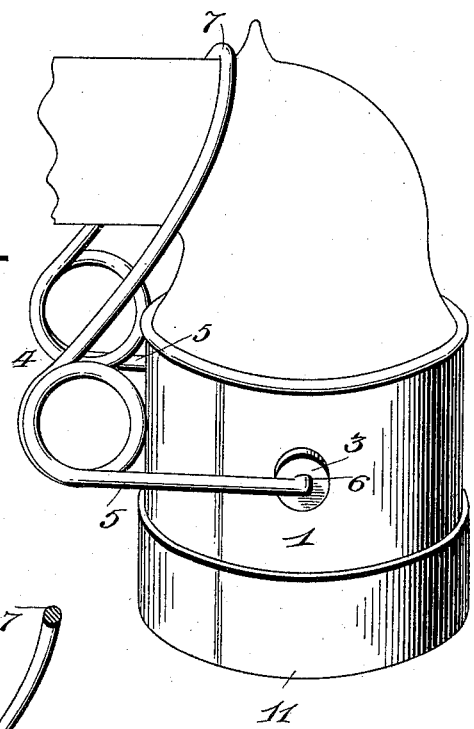
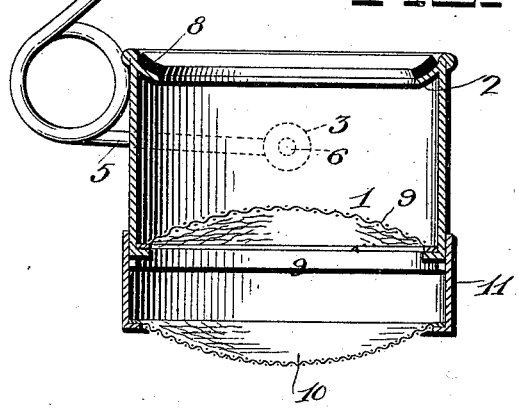
Witnesses  Inventor
George W. Woodworth,
by H. B. Willson & Co
Attorneys

UNITED STATES PATENT OFFICE.

GEORGE W. WOODWORTH, OF MONMOUTH, ILLINOIS.

FILTER.

SPECIFICATION forming part of Letters Patent No. 643,181, dated February 13, 1900.

Application filed June 1, 1899. Serial No. 718,986. (No model.)

*To all whom it may concern:*

Be it known that I, GEORGE W. WOODWORTH, a citizen of the United States, residing at Monmouth, in the county of Warren and State of Illinois, have invented certain new and useful Improvements in Filters; and I do declare the following to be a full, clear, and exact description of the invention, such as will enable others skilled in the art to which it appertains to make and use the same.

The invention has relation to filters, and more particularly to that class of devices adapted to be attached to the spouts of pumps now in general use.

The object of the invention is to provide a simple, durable, and inexpensive device of this character which will effectively separate all foreign matter from the water as it is discharged from the spout and which may be easily removed from the spout and the parts separated for the purpose of cleaning them.

With this object in view the invention consists in certain features of construction and combination of parts, which will be hereinafter fully described and claimed.

In the drawings, Figure 1 is a view illustrating the application of my invention. Fig. 2 is a longitudinal sectional view through the device.

Like numerals of reference indicate like parts in both views.

1 denotes the casing or body of the filter, which is cylindrical in form and is provided at its upper end with an annular inwardly-projecting flange 2.

3 denotes socket-lugs secured on the sides of the cylinder at diametrically opposite points.

4 denotes the spring-clasp, which consists of the arms 5, having inturned ends 6, that engage the socket-lugs. The rear ends of these arms are turned in the form of coils and thence extend forwardly and upwardly to form the bail 7, which is adapted to grasp the pump-spout in the manner shown in Fig. 1 of the drawings and compress the rubber gasket 8, which is seated upon the inwardly-projecting annular flange 2, firmly against the mouth of the spout, thereby forming a water-tight joint.

9 denotes a strainer which is fitted to the interior walls of the casing, and 10 denotes a second strainer, which is provided with a band 11, that engages the lower end of the casing. This strainer is located below the first-named strainer and is of a finer mesh than the said first-named strainer, so that the larger particles of foreign matter will be caught and retained by the upper strainer, and thereby prevent the lower strainer, which is designed to catch the smaller particles of matter or matter that escapes through the upper strainer, from becoming quickly clogged.

When it is desired to clean the strainers or, in fact, the filter as a whole, it may be readily removed from the spout of the pump and the parts quickly cleaned.

Having thus described the invention, what is claimed, and desired to be secured by Letters Patent, is—

The combination with a cylindrical casing having at its upper end an inwardly-projecting annular flange, of a gasket seated on said flange, socket-lugs secured at diametrically opposite points to the outside of the casing, strainers of different mesh secured to the casing one above the other, and a clasp consisting of arms, the outer ends of which are bent inwardly to form trunnions to engage the socket-lugs and the inner ends of which are formed with spring-coils which terminate in a forwardly and upwardly projecting bail designed to engage the pump-spout and hold the gasket in water-tight engagement with the mouth thereof, substantially as and for the purpose set forth.

In testimony whereof I have hereunto set my hand in presence of two subscribing witnesses.

GEORGE W. WOODWORTH.

Witnesses:
 A. B. EDWARDS,
 JOHN M. TURNBULL.